United States Patent
Kim et al.

(10) Patent No.: US 9,484,985 B2
(45) Date of Patent: Nov. 1, 2016

(54) APPARATUS AND METHOD FOR COMMUNICATION USING WIRELESS POWER

(75) Inventors: Nam Yun Kim, Seoul (KR); Sang Wook Kwon, Seongnam-si (KR); Yun Kwon Park, Dongducheon-si (KR); Eun Seok Park, Yongin-si (KR); Young Tack Hong, Seongnam-si (KR); Ki Young Kim, Yongin-si (KR); Young Ho Ryu, Yongin-si (KR); Dong Zo Kim, Yongin-si (KR); Jin Sung Choi, Gimpo-si (KR); Chang Wook Yoon, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 252 days.

(21) Appl. No.: 13/483,441

(22) Filed: May 30, 2012

(65) Prior Publication Data

US 2012/0309305 A1 Dec. 6, 2012

(30) Foreign Application Priority Data

May 31, 2011 (KR) ........................ 10-2011-0052201

(51) Int. Cl.
*H04B 5/00* (2006.01)
*H02J 7/02* (2016.01)

(52) U.S. Cl.
CPC ............. *H04B 5/0031* (2013.01); *H02J 7/025* (2013.01); *H04B 5/0037* (2013.01); *H04B 5/0081* (2013.01)

(58) Field of Classification Search
CPC ........ H02J 17/00; H04L 27/00; H04L 27/02; H04L 27/22; H04B 1/40; H04B 5/00; H04B 5/0031; H04B 5/0037; H04B 5/0081
USPC ......... 455/41.1, 41.2, 67.11, 67.14, 73, 106; 320/108, 137; 307/104, 105, 106
See application file for complete search history.

(56) References Cited

U.S. PATENT DOCUMENTS

| | | | |
|---|---|---|---|
| 8,135,354 B2 * | 3/2012 | Duron et al. | 455/41.1 |
| 2007/0246546 A1 | 10/2007 | Yoshida | |
| 2008/0067874 A1 | 3/2008 | Tseng | |
| 2008/0309452 A1 | 12/2008 | Zeine | |
| 2010/0045114 A1 | 2/2010 | Sample et al. | |
| 2010/0277003 A1 * | 11/2010 | Von Novak et al. | 307/104 |
| 2011/0043336 A1 | 2/2011 | Gueorguiev | |
| 2011/0053500 A1 | 3/2011 | Menegoli et al. | |
| 2011/0065398 A1 | 3/2011 | Liu et al. | |
| 2012/0083205 A1 * | 4/2012 | Marcu et al. | 455/41.1 |
| 2013/0119928 A1 * | 5/2013 | Partovi | 320/108 |

* cited by examiner

*Primary Examiner* — Thanh Le
(74) *Attorney, Agent, or Firm* — NSIP Law

(57) ABSTRACT

An apparatus and method are described that may enable a target device to communicate with a source device using a wireless power. The communication apparatus receives a wireless power from a source resonator through a magnetic coupling between the source resonator and a target resonator. The communication apparatus transmits a message, and modulates the message based on the received wireless power and impedance mismatch between the source device and the target device. The communication apparatus controls the impedance mismatch by changing an impedance of the target device.

16 Claims, 16 Drawing Sheets

APPARATUS AND METHOD FOR COMMUNICATION USING WIRELESS POWER

CROSS-REFERENCE TO RELATED APPLICATION(S)

This application claims the benefit under 35 U.S.C. §119 (a) of Korean Patent Application No. 10-2011-0052201, filed on May 31, 2011, in the Korean Intellectual Property Office, the entire disclosure of which is incorporated herein by reference.

BACKGROUND

1. Field

The following description relates to an apparatus and method by which a target device communicates with a source device using a wireless power.

2. Description of Related Art

As demand for portable electronic devices has rapidly increased, use of wired power supplies for these devices has become more inconvenient. Studies on wireless power transmission have been conducted to overcome inconveniences of wired power supplies and the limited capacity of conventional batteries. One conventional wireless power transmission technology uses a resonance characteristic of a radio frequency (RF) device that may include a source that supplies power and a target that receives power. When a source device and a target device exchange information, the source device may effectively transmit power to the target device. Therefore, communication between the source device and the target device may be needed.

SUMMARY

In one general aspect, there is provided a communication apparatus including a target resonance unit configured to receive a wireless power from a source resonator, and to transmit a message through a magnetic coupling between the source resonator and a target resonator. The communication apparatus includes a modulation unit configured to modulate the message based on the wireless power and impedance mismatch between a source device and a target device. The communication apparatus includes a control unit configured to control the impedance mismatch by changing an impedance of the target device.

In accordance with a further aspect, there is provided a communication apparatus including a target resonance unit configured to receive a wireless power through a magnetic coupling between a source resonator and a target resonator. The communication apparatus includes a demodulation unit configured to demodulate a message from a source device by comparing a direct current (DC) signal of the wireless power and a reference signal. The communication apparatus also includes a control unit configured to output the reference signal and to perform impedance matching between the source device and a target device.

In accordance with another aspect, there is provided a communication method including receiving a wireless power from a source resonator through a magnetic coupling between the source resonator and a target resonator. The communication method includes controlling impedance mismatch between a source device and a target device by changing an impedance of the target device. The communication method further includes modulating a message based on the received wireless power and the impedance mismatch.

In accordance with an illustrative example, there is provided a communication apparatus, including a target resonance unit configured to receive a wireless power from a source device, and configured to transmit a message comprising a change in an impedance of a target device. The communication apparatus includes a modulation unit configured to modulate the message based on the wireless power and impedance mismatch between the source device and the target device. The communication apparatus further includes a control unit configured to control the impedance mismatch between the source device and the target device by controlling an amount of current flowing through a load at the target device, ON and OFF states of the current flowing through the load, or by adjusting an amount of power stored in a battery of the load.

In accordance with an illustrative example, a computer program is embodied on a non-transitory computer readable medium, the computer program being configured to control a processor to perform receiving a wireless power from a source resonator through a magnetic coupling between the source resonator and a target resonator. The computer program is also configured to control the processor to perform controlling impedance mismatch between a source device and a target device by changing an impedance of the target device. The computer program is also configured to control the processor to perform modulating a message based on the received wireless power and the impedance mismatch.

In accordance with an aspect, there is provided a computer program is embodied on a non-transitory computer readable medium, the computer program being configured to control a processor to perform receiving a wireless power through a magnetic coupling between a source resonator and a target resonator. The computer program is also configured to control the processor to perform demodulating a message from a source device, by comparing a direct current (DC) signal of the received wireless power and a reference signal, and outputting the reference signal. The computer program is also configured to control the processor to perform impedance matching between the source device and a target device.

Other features and aspects will be apparent from the following detailed description, the drawings, and the claims.

Figure 1:
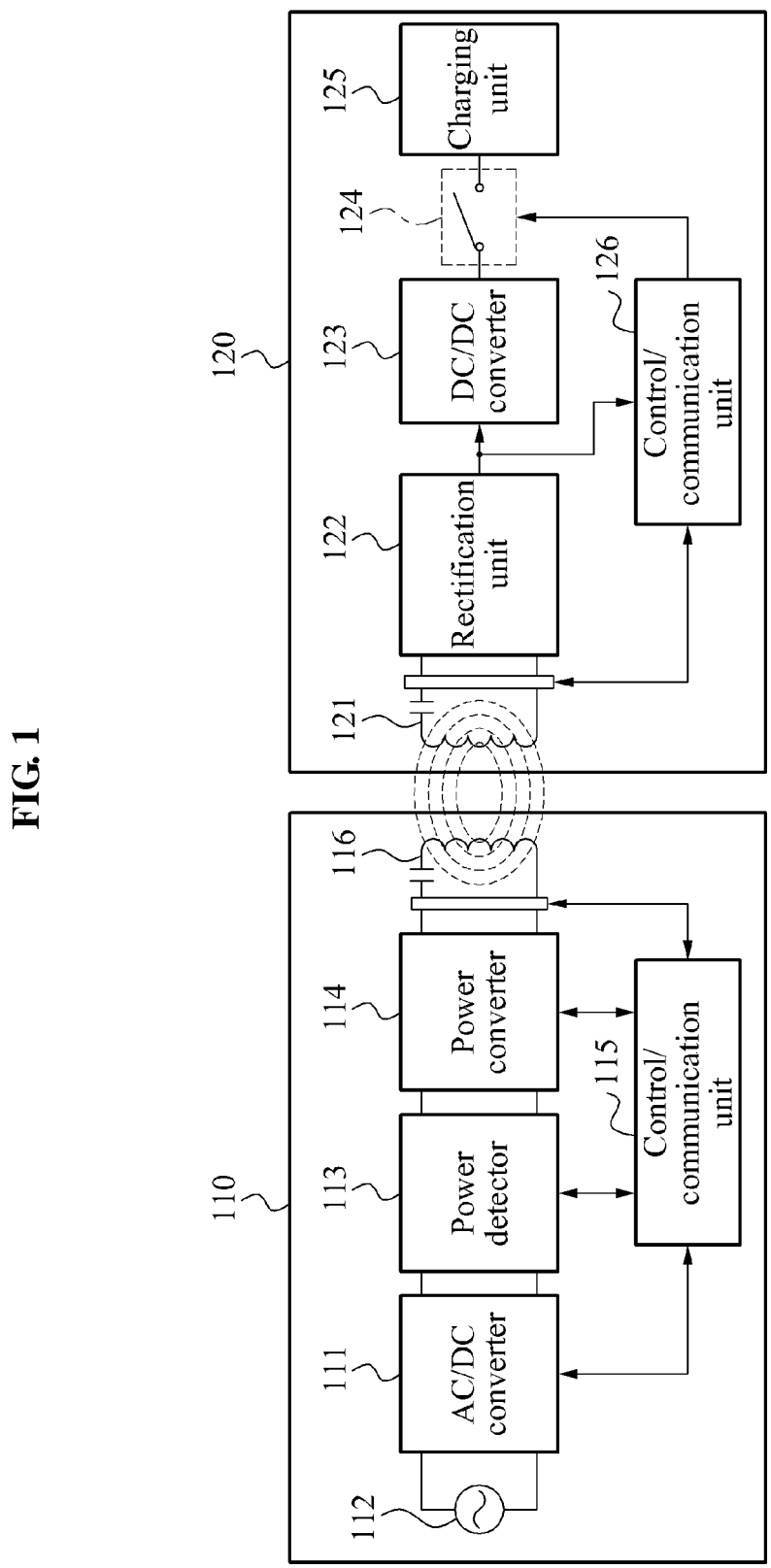
FIG. 1 is a diagram illustrating a wireless power transmission system, according to an illustrative example.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates a wireless power transmission system, according to an illustrative aspect.

Referring to FIG. 1, the wireless power transmission system includes a source device 110 and a target device 120. The source device 110 may correspond to a device supplying a wireless power, and may include various electric devices that supply power, such as pads, terminals, televisions (TVs), and the like. The target device 120 may correspond to a device receiving a wireless power, and may include an assorted range of electronic devices that consume power, such as terminals, TVs, vehicles, washing machines, radios, lighting systems, and the like.

The source device 110 may include an alternating current-to-direct current (AC/DC) source 112, an alternating current-to-direct current (AC/DC) converter 111, a power detector 113, a power converter 114, a control and communication (control/communication) unit 115, and a source resonator 116.

The target device 120 may include a target resonator 121, a rectification unit 122, a DC-to-DC (DC/DC) converter 123, a switch unit 124, a charging unit 125, and a control/communication unit 126.

The AC/DC converter 111 may receive an AC voltage from the AC/DC source 112 and output a DC voltage of a predetermined level, or may adjust an output level of a DC voltage based on the control of the control/communication unit 115.

The power detector 113 may detect an output current and the output DC voltage of the AC/DC converter 111, and may transfer, to the control/communication unit 115, information on the detected current and the detected voltage. The power detector 113 may also detect an input current and an input voltage of the power converter 114.

The power converter 114 may generate power by converting the DC voltage of a predetermined level to an AC voltage, using a switching pulse signal in a band of a few megahertz (MHz) to tens of MHz. The power converter 114 may convert the DC voltage to the AC voltage using a resonant frequency and thus, may generate a communication power to be to be used to communicate or a charging power to be used to charge in the target device 120. In one example, the communication power may correspond to energy for activating a processor and a communication module in a control/communication unit 126 of the target device 120. Further, the communication power may be referred to as a wake-up power in terms of the energy for activating a processor and a communication module of the target device 120. The communication power may be transmitted in a form of a constant wave during a predetermined time. In one example, the charging power may correspond to energy for charging a battery connected to or included in a charging unit 125 of the target device 120. Further, the charging power may be continuously transmitted during a predetermined time, and may be transmitted at a power level greater than a power level of the communication power.

The control/communication unit 115 may control a frequency of a switching pulse signal. The frequency of the switching pulse signal may be determined based on the control of the frequency of the control/communication unit 115. By controlling the power converter 114, the control/communication unit 115 may generate a modulated signal to be transmitted to the target device 120. The control/communication unit 115 may transmit various messages to the target device 120, through an in-band communication. The control/communication unit 115 may detect a reflected wave, and may demodulate a signal received from the target device 120 through an envelope of the detected reflected wave.

The control/communication unit 115 may generate the modulated signal for an in-band communication, using various schemes. To generate the modulated signal, the control/communication unit 115 may turn a switching pulse signal ON and OFF, or may perform delta-sigma modulation. Additionally, the control/communication unit 115 may generate a pulse-width modulated (PWM) signal having a predetermined envelope.

The control/communication unit 115 may perform an out-band communication using a communication channel, as opposed to using a resonant frequency. The control/communication unit 115 may include a communication module, such as a ZigBee module, a Bluetooth module, and the like. The control/communication unit 115 may perform transmission and reception of data with the target device 120, through the out-band communication.

The source resonator 116 may transfer an electromagnetic energy to the target resonator 121. The source resonator 116 may transfer, to the target device 120, a communication power to be used to communicate or a charging power to be used to charge through a magnetic coupling with the target resonator 121.

The target resonator 121 may receive the electromagnetic energy from the source resonator 116. The target resonator 121 may receive, from the source device 110, the communication power or the charging power through a magnetic coupling with the source resonator 116. The target resonator 121 may receive various messages from the source device 110 through the in-band communication.

The rectification unit 122 may generate a DC voltage by rectifying an AC voltage. In one example, the AC voltage may be received from the target resonator 121.

The DC/DC converter 123 may adjust a level of the DC voltage output from the rectification unit 122, based on a capacity of the charging unit 125. For example, the DC/DC converter 123 may adjust the level of the DC voltage output from the rectification unit 122 from a range of 3 Volts (V) to 10 V.

The switch unit 124 may be turned ON and OFF, based on a control of the control/communication unit 126. When the switch unit 124 is turned OFF, the control/communication 115 of the source device 110 may detect a reflected wave. When the switch unit 124 is turned OFF, the magnetic coupling between the source resonator 116 and the target resonator 121 may be eliminated.

The charging unit 125 may include a battery. The charging unit 125 may charge the battery using a DC voltage output from the DC/DC converter 123.

The control/communication unit 126 may perform an in-band communication for transmitting and receiving data using a resonant frequency. In this example, the control/communication unit 126 may demodulate a received signal by detecting a signal between the target resonator 121 and the rectification unit 122, or by detecting an output signal of the rectification unit 122. The control/communication unit 126 may demodulate a message received through the in-band communication. Also, the control/communication unit 126 may adjust an impedance of the target resonator 121 so as to modulate a signal to be transmitted to the source device 110. The control/communication unit 126 may modulate the signal to be transmitted to the source device 110, by turning the switch unit 124 ON and then OFF. For example, the control/communication unit 126 may increase the impedance of the target resonator 121 so that a reflected wave may be detected by the control/communication unit 115 of the source device 110. In this example, depending on whether the reflected wave is detected, the control/communication unit 115 may detect a binary value of "0" or "1."

The control/communication unit 126 may perform an out-band communication using a communication channel. The control/communication unit 126 may include a communication module, such as a ZigBee module, a Bluetooth module, and the like. The control/communication 126 may perform transmission and reception of data with the source device 110 through the out-band communication.

Figure 2:
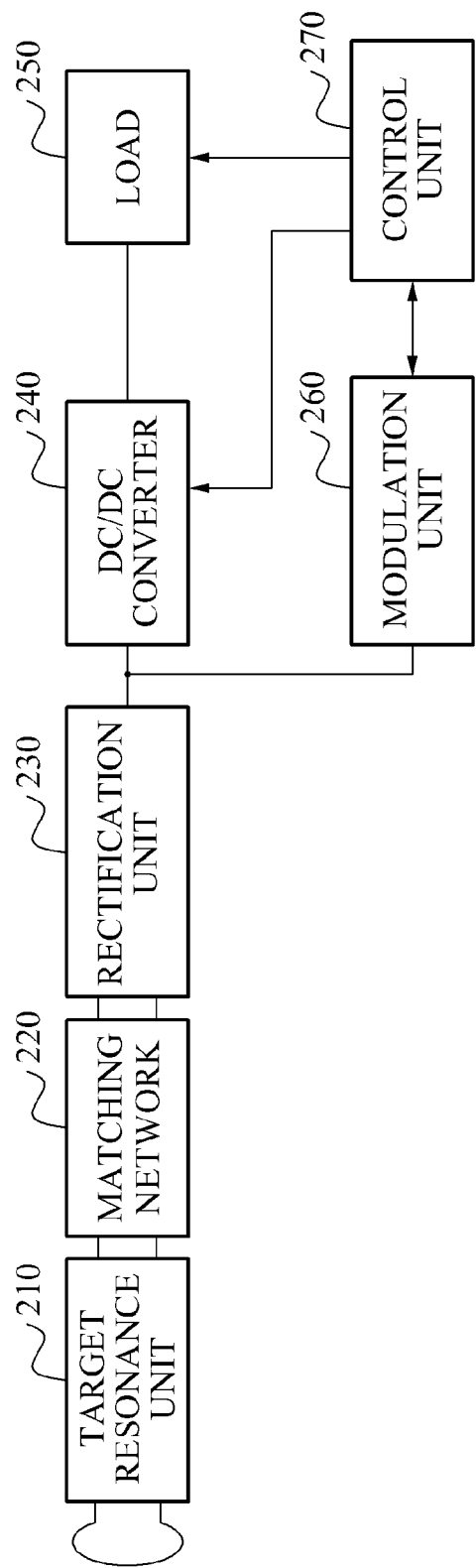
FIG. 2 is a block diagram illustrating an example of a communication apparatus using a wireless power according to an illustrative example.

FIG. 2 illustrates a communication apparatus of a target device using a wireless power, according to an illustrative example.

Referring to FIG. 2, the communication apparatus includes a target resonance unit 210, a matching network 220, a rectification unit 230, a DC/DC converter 240, a load 250, a modulation unit 260, and a control unit 270.

The target resonance unit 210 may receive a wireless power from a source resonator through a magnetic coupling between the source resonator and a target resonator. The target resonance unit 210 may transmit a message modulated based on a change in an impedance of a target device. The target resonance unit 210 may receive a wake-up power used to drive the control unit 270 of the target device. The matching network 220 may match an output impedance of the target resonance unit 210 and an input impedance of the matching network 220. The matching network 220 may perform impedance matching so that the wireless power received through the target resonance unit 210 may be efficiently transferred to the load 250. The rectification unit 230 may rectify an AC signal to a DC signal. Because the received wireless power corresponds to an AC signal, the rectification unit 230 may rectify the received wireless power to a DC signal. The DC/DC converter 240 may convert the DC signal to a voltage level or a current level to be used for the load 250.

The modulation unit 260 may use a resonant frequency of the received wireless power as a carrier frequency. The modulation unit 260 may modulate a message from a source device based on impedance mismatch between the source device and the target device. When impedance matching between the source device and the target device is performed, wireless power transmission may be initiated. When an impedance of the target device is changed, impedance mismatch may occur. When the impedance mismatch occurs, a reflected power of the target device may increase. That is, by intentionally adjusting the impedance mismatch, the reflected power of the target device may be changed and the message may be modulated. Such message modulation may be referred to as load modulation. The reflected power may refer to power that is not received, but is reflected by the target device, among power transmitted by the source device. Data to be mapped to the impedance mismatch may be provided by the control unit 270.

The control unit 270 may change an impedance of the target device. Accordingly, the control unit 270 may control impedance mismatch between the source device and the target device.

The control unit 270 may change the impedance of the target device by controlling an amount of a current, or ON and OFF states of the current flowing through a load or an active load. When current flows through the load 250 or an active load connected to the target device, the impedance of the target device may be changed. In particular, a variable load or the active load may be connected to the load 250 in parallel. In this instance, the control unit 270 may change a size of the variable load.

Also, in one aspect, the control unit 270 may change the impedance of the target device through a current source operating as a load. In another aspect, the control unit 270 may change the impedance of the target device by controlling an amount of current flowing through the current source.

The control unit 270 may change the impedance of the target device using ON and OFF states of a switch (for example, switch unit 124 of FIG. 1) connected to the load 250 of the target device. The control unit 270 may change the impedance of the target device based on a connection between the load 250 and the DC/DC converter 240.

The control unit 270 may change the impedance of the target device using an amount of power stored in a battery in the load 250 of the target device. An impedance of the battery may be changed based on the amount of the power stored in the battery. Accordingly, the impedance of the target device, which includes the battery, may be changed as well. That is, the control unit 270 may change the impedance of the target device by adjusting the amount of the power stored in the battery.

Figure 3:
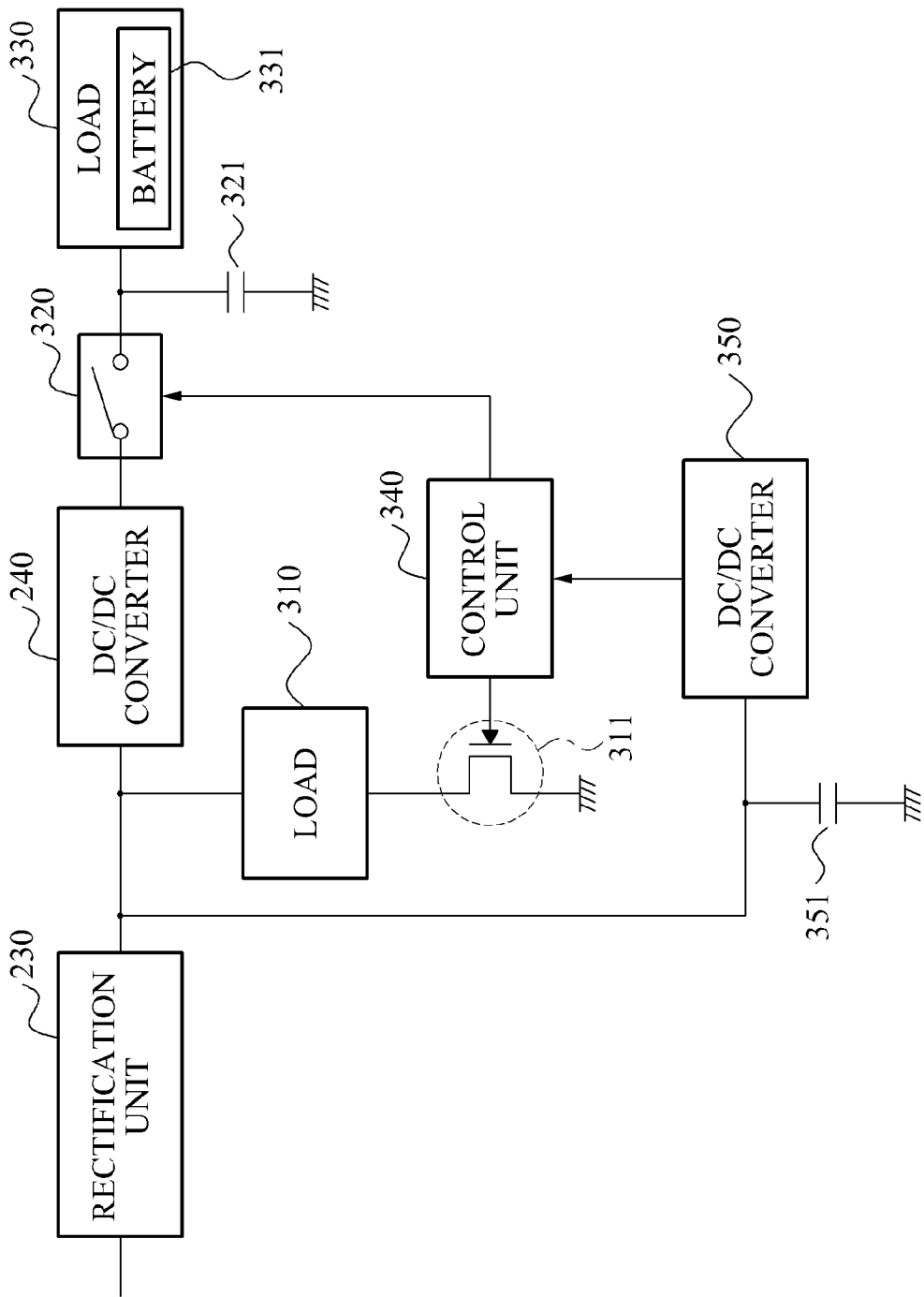
FIG. 3 is a diagram illustrating a detailed example of the communication apparatus of FIG. 2 according to an illustrative example.

FIG. 3 illustrates the communication apparatus of FIG. 2, in detail, according to an illustrative example.

Referring to FIG. 3, a load 310 may be connected to a front end of the DC/DC converter 240 of FIG. 2, in parallel. A control unit 340 may control a transistor 311 to control a flow of a current using the load 310. In one example, the transistor 311 may be operated as a switch. The control unit 340 may control the transistor 311 to enable a current to flow through the load 310 or not to flow through the load 310. Also, the control unit 340 may control the transistor 311 to control an amount of a current flowing through the load 310. In this instance, the control unit 340 may control a voltage that is input by the control unit 340 to the transistor 311 in order to control the amount of the current flowing through the load 310. The transistor 311 may include various types of transistors that are currently used, for example, a bi-polar junction transistor (BJT), a field-effect transistor (FET), an insulated gate bi-polar transistor (IGBT), and the like. When a current flows through the load 310, an impedance of the target device may be changed. That is, the control unit 340 may change the impedance of the target device by controlling the flow of the current flowing through the load 310.

The control unit 340 may control a switch 320 that turns a connection between the DC/DC converter 240 and a load 330 ON and OFF. An impedance when the load 330 and the DC/DC converter 240 are connected may be different from an impedance when the load 330 and the DC/DC converter 240 are disconnected. Accordingly, the control unit 340 may change the impedance of the target device by controlling the switch 320. Energy may be stored in a capacitor 321 in order to stably supply power to the load 330.

The control unit 340 may control an amount of power stored in a battery 331 of the load 330. An impedance of the load 330 may be changed based on the amount of the power stored in the battery 331. The control unit 340 may change the impedance of the load 330 and the impedance of the target device, by adjusting the amount of the power stored in the battery 331.

The DC/DC converter 350 may convert a DC signal to a voltage level or a current level used for an operation of the control unit 340. A reserve power may be stored in a capacitor 351 so that the control unit 340 may continuously be operated.

Figure 4:
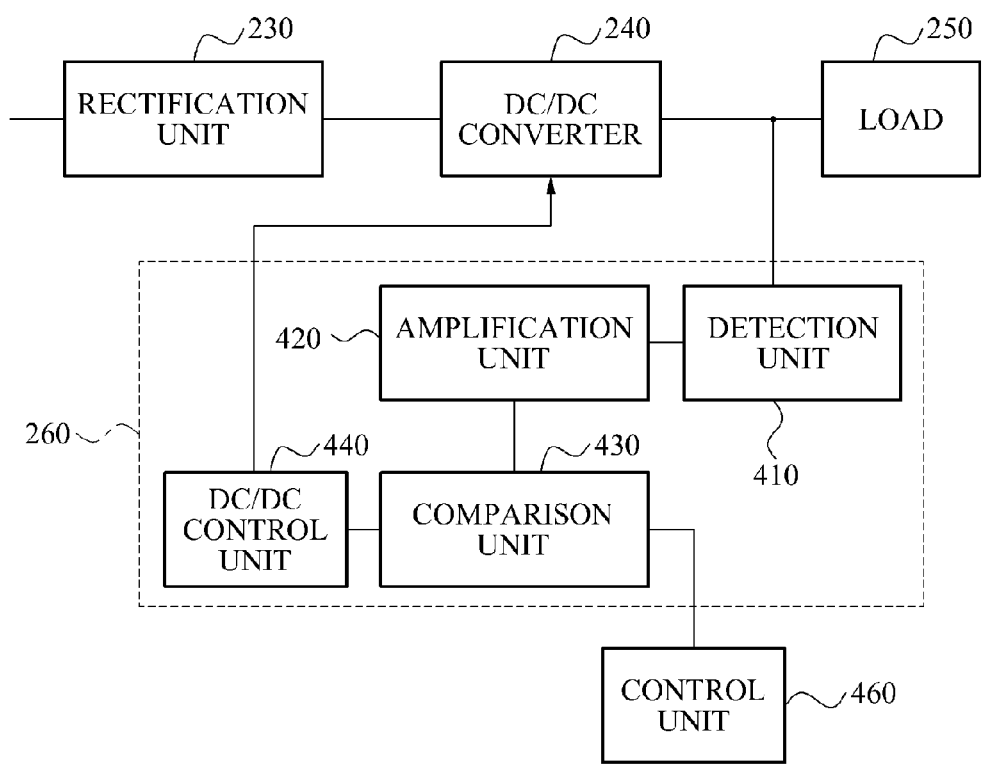
FIG. 4 is a diagram illustrating a modulation unit according to an illustrative example.

FIG. 4 illustrates a modulation unit, according to an illustrative example.

Referring to FIG. 4, the modulation unit 260 of FIG. 2 includes a detection unit 410, an amplification unit 420, a comparison unit 430, and a DC/DC control unit 440. The modulation unit 260 may compare a detected DC signal with an objective value, and may control a received power so that the detected DC signal may reach the objective value. In one illustrative example, the objective value may include 4.2V, 5V, or 7V. The objective value may be determined based on a reference voltage of a target device or the voltage of a battery. The modulation unit 260 may modulate a message from a target device based on the objective value.

The detection unit 410 may detect a DC signal transferred to the load 250 of FIG. 2. The DC signal may correspond to a DC signal rectified by the rectification unit 230 of FIG. 2, or a DC signal converted by the DC/DC converter 240 of FIG. 2. The amplification unit 420 may amplify the detected DC signal by a predetermined factor. In one illustrative example, the predetermined factor is 15. Because the detected DC signal corresponds to a signal of a small size, the detected DC signal may be amplified by the predetermined factor for comparison, and may be compared with a reference signal. In one illustrative example, the signal of small size may include 30 mV. The comparison unit 430 may output a 'High' value or a 'Low' value by comparing the amplified DC signal and the reference signal. The reference signal may correspond to an objective voltage to be used to modulate a message. For example, when the amplified DC signal corresponds to 330 millivolts (mV), and the objective voltage corresponds to 500 mV, the reference signal may correspond to 500 mV. The reference signal may be provided by a control unit 460. The comparison unit 430 may output a pulse signal that is indicated using a 'High' value or a 'Low' value. 'High' value may correspond to a bit of 1, and 'Low' value may correspond to a bit of 0. Conversely, 'High' value may correspond to a bit of 0, and 'Low' value may correspond to a bit of 1, predetermined settings. The DC/DC control unit 440 may control the DC/DC converter 240 based on the pulse signal indicated using the 'High' value or a 'Low' value. The DC/DC control unit 440 may control the DC/DC converter 240 to perform an operation when the pulse signal corresponds to a 'High' value according to settings, and may control the DC/DC converter 240 to not perform an operation when the pulse signal corresponds to a 'Low' value. For example, when the DC/DC converter 240 performs the operation, the DC signal may be converted to be compliant with a rated voltage of the load 250. When the DC/DC converter 240 does not perform the operation, the DC signal rectified by the rectification unit 230 may be transferred to the load 250, instead of being converted to a predetermined DC signal. Conversely, the DC/DC control unit 440 may control the DC/DC converter 240 to perform the operation when the pulse signal corresponds to a 'Low' value according to settings, and may control the DC/DC converter 240 to not perform the operation when the pulse signal corresponds to a 'High' value.

Figure 5:
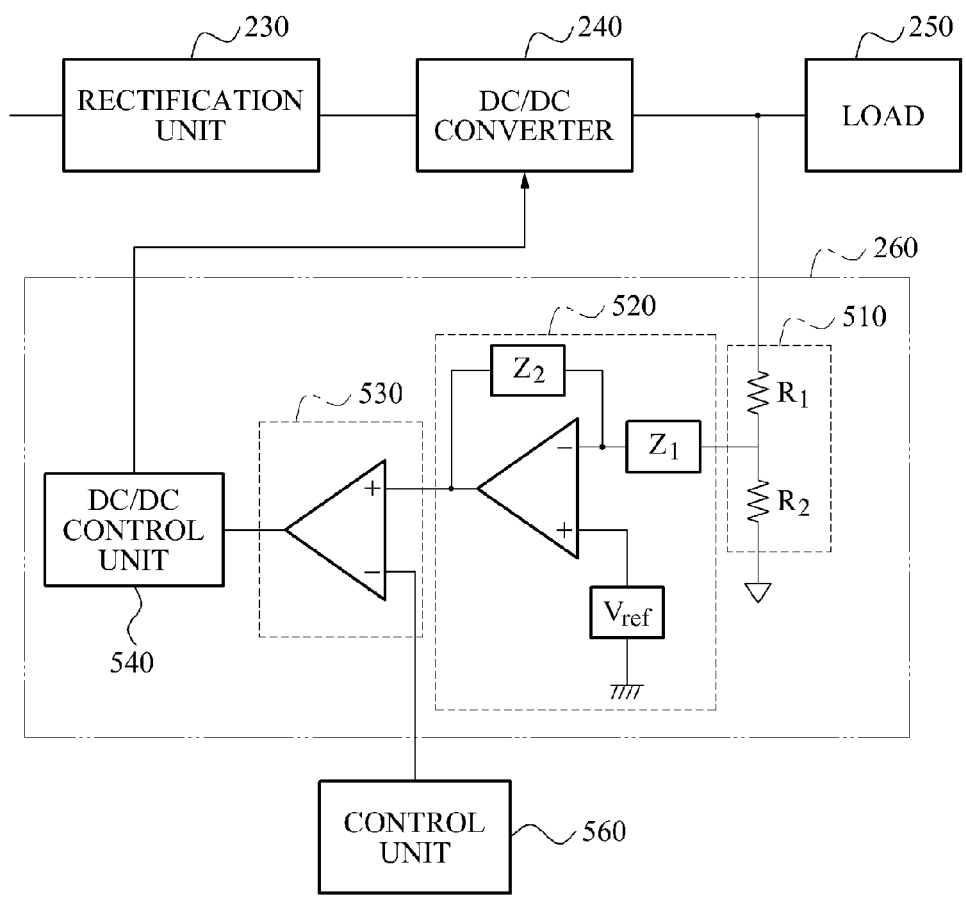
FIG. 5 is a diagram illustrating another modulation unit, according to another illustrative example.

FIG. 5 illustrates another modulation unit, according to an illustrative example.

Referring to FIG. 5, a detection unit 510 included in the modulation unit 260 of FIG. 2 may detect a DC signal currently transferred to the load 250 of FIG. 2 based on resistances $R_1$ and $R_2$. An amplification unit 520 may amplify the detected DC signal based on a $V_{ref}$ and a ratio of $Z_1$ to $Z_2$. In one example, $Z_1$ and $Z_2$ may correspond to predetermined impedances. The exemplary values of $R_1$ and $R_2$ are determined based on a ratio of $R_1$ and $R_2$, so the exemplary ratio of $R_1$ and $R_2$ is 1:20. The exemplary values of $Z_1$ and $Z_2$ are determined based on the ratio of $Z_1$ and $Z_2$, so the exemplary ratio of $Z_1$ and $Z_2$ is 1:15. $V_{ref}$ may correspond to a voltage that is set based on a level of amplification. A comparison unit 530 may output a 'High' value or a 'Low' value by comparing the amplified DC signal and a reference signal. The reference signal may correspond to an objective voltage to be used to modulate a message. The reference signal may be provided by a control unit 560. A DC/DC control unit 540 may control the DC/DC converter 240 of FIG. 2 based on the 'High' value or the 'Low' value output from the comparison unit 530. The comparison unit 530 may output a pulse signal having the 'High' value or the 'Low' value. The DC/DC control unit 540 may control the DC/DC converter 240 based on the pulse signal. Each pulse signal may have different duration. An operation time of the DC/DC converter 240 may be determined based on duration of the pulse signal. The DC/DC control unit 540 may control the DC/DC converter 240 based on the pulse signal until the objective voltage is detected by the detection unit 510. The modulation unit 260 may modulate a message based on the detected objective voltage.

Figure 6:
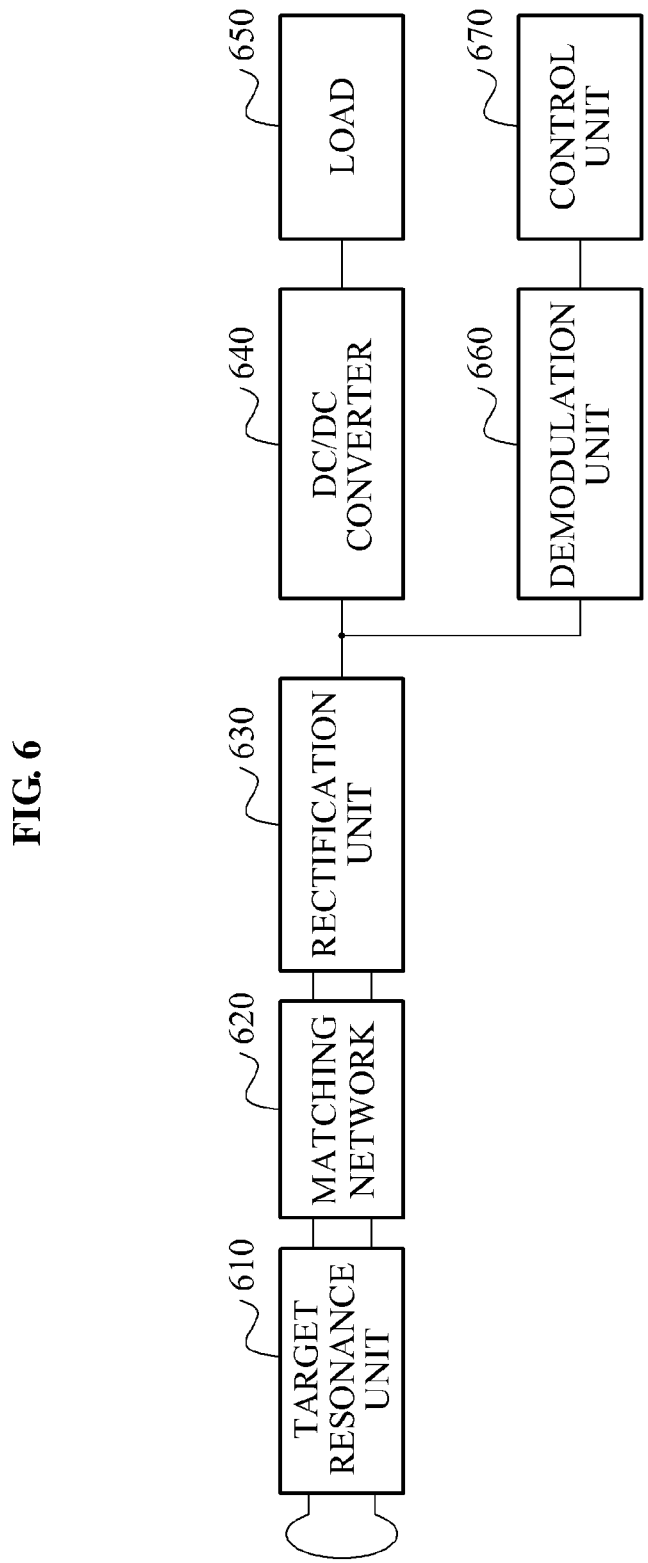
FIG. 6 is a block diagram illustrating another communication apparatus using a wireless power, according to another illustrative example.

FIG. 6 illustrates another communication apparatus using a wireless power, according to an illustrative example.

Referring to FIG. 6, the communication apparatus includes a target resonance unit 610, a matching network 620, a rectification unit 630, a DC/DC converter 640, a load 650, a demodulation unit 660, and a control unit 670.

The target resonance unit 610 may receive a wireless power from a source resonator, through a magnetic coupling between the source resonator and a target resonator. The target resonance unit 610 may receive a message transmitted from the source resonator using wireless power. The target resonance unit 610 may receive a wake-up power used to drive the control unit 670 of a target device. The matching network 620 may match an output impedance of the target resonance unit 610 and an input impedance of the matching network 620. The matching network 620 may perform impedance matching so that the wireless power received through the target resonance unit 610 may be efficiently transferred to the load 650. The rectification unit 630 may rectify an AC signal to a DC signal. Because the received wireless power corresponds to the AC signal, the rectification unit 630 may rectify the received wireless power to the DC signal. The DC/DC converter 640 may convert the DC signal to a voltage level or a current level to be used for the load 650.

The demodulation unit 660 may demodulate a message from a source device based on a value obtained by comparing the DC signal of the wireless power and a reference signal. For example, the demodulation unit 660 may demodulate the message from the source device by determining the DC signal of the wireless power to be 'High' when the DC signal of the wireless power is greater than the reference signal, and by determining the DC signal of the wireless power to be 'Low' when the DC signal of the wireless power is less than the reference signal. 'High' value may correspond to a bit of 1, and 'Low' value may correspond to a bit of 0. Conversely, 'High' value may correspond to a bit of 0, and 'Low' value may correspond to a bit of 1, predetermined settings. When the message from the source device is amplified and modulated, the DC signal of the wireless power may have a value that, depending on modulation, is variable. The demodulation unit 660 may demodulate the message from the source device by comparing the variable value with the reference signal.

The control unit 670 may provide the reference signal to the demodulation unit 660. The reference signal may correspond to a predetermined fixed value. Also, the reference signal may correspond to a variable value that is set based on the DC signal of the wireless power. The control unit 670 may perform impedance matching between the source device and the target device by controlling the matching network 620.

Figure 7:
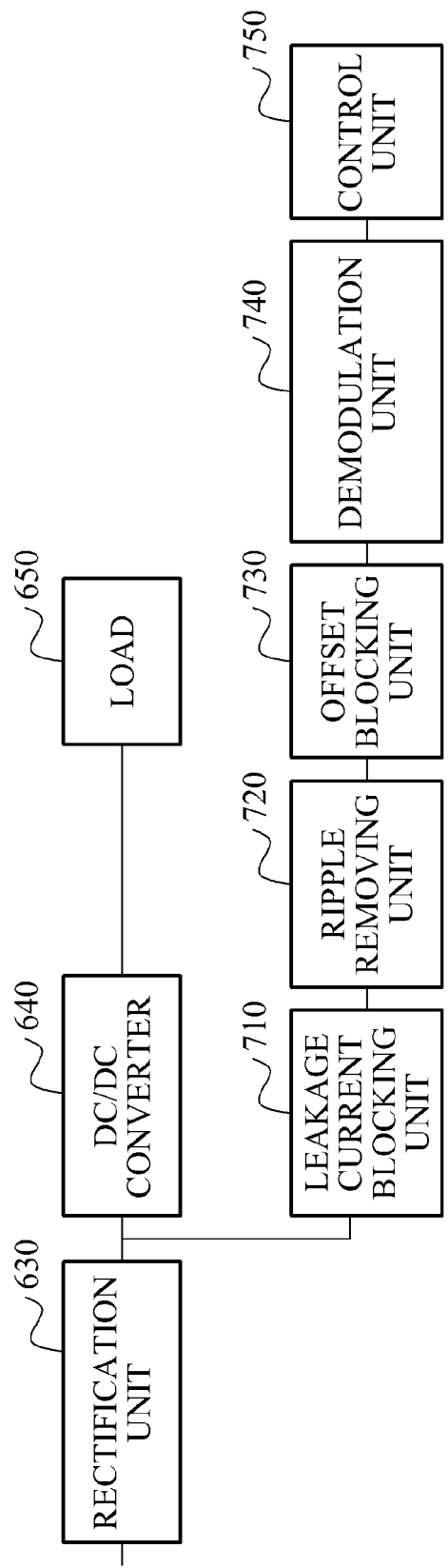
FIG. 7 is a block diagram illustrating still another example of a communication apparatus using a wireless power, according to an illustrative example.

FIG. 7 illustrates still another communication apparatus using wireless power, according to an illustrative example.

Referring to FIG. 7, the communication apparatus includes a leakage current blocking unit 710, a ripple removing unit 720, and an offset blocking unit 730.

The leakage current blocking unit 710 may block a current that leaks from a DC signal of wireless power in a direction of the rectification unit 630 of FIG. 6. Because the current leaking towards the rectification unit 630 may reduce the DC signal of the wireless power, the leakage current may need to be blocked. The ripple removing unit 720 may remove a ripple signal included in the DC signal of the wireless power. The wireless power received through a target resonance unit may include the ripple signal when passing through the matching network 620 and the rectification unit 630 of FIG. 6. Because the ripple signal may distort the DC signal of the wireless power, the ripple signal may need to be blocked for more accurate message restoration. The offset blocking unit 730 may block a DC offset voltage included in the DC signal of the wireless power. For example, the DC offset voltage may be accumulated in the wireless power received through the target resonance unit when the wireless power passes through the matching network 620 and the rectification unit 630. In this instance, the DC offset voltage may need to be blocked for more accurate message demodulation.

Figure 8:
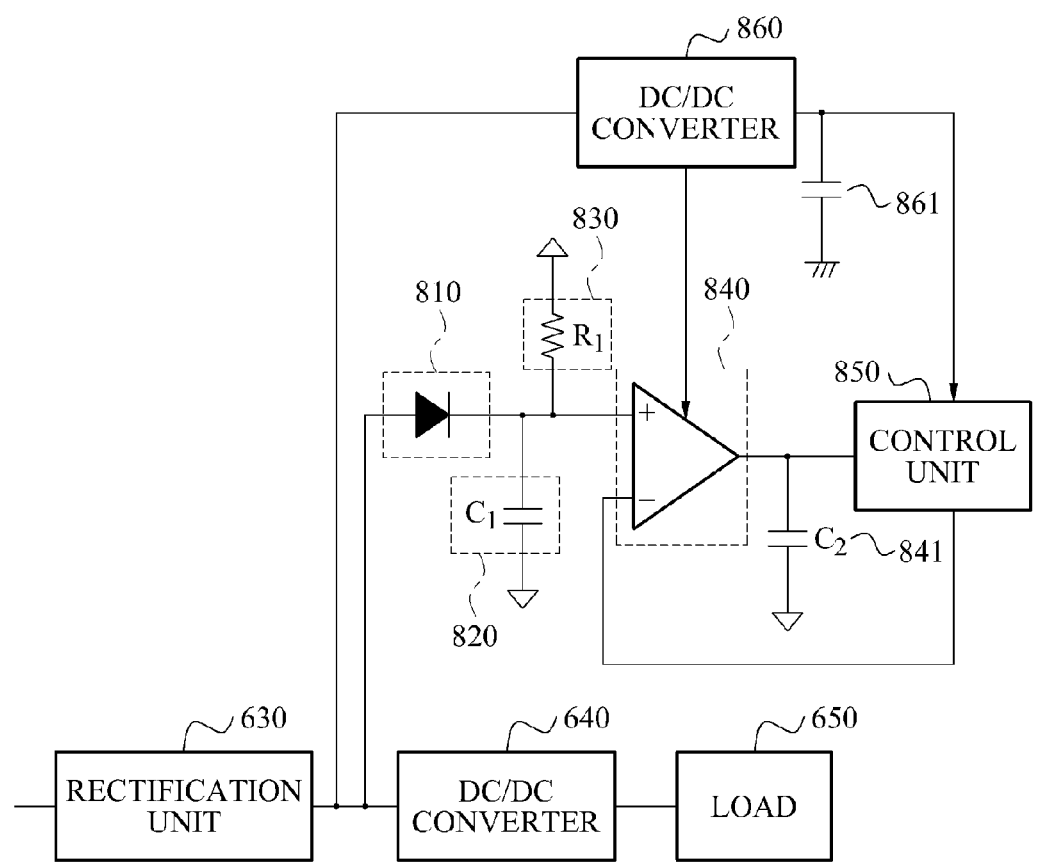
FIG. 8 is a diagram illustrating the communication apparatus of FIG. 7, in detail, according to an illustrative example.

FIG. 8 illustrates the communication apparatus of FIG. 7, in detail, according to example embodiments. In one example, the leakage current blocking unit 710, the ripple removing unit 720, and the offset blocking unit 730 of FIG. 7 may be referred to as a leakage current blocking unit 810, a ripple removing unit 820, and an offset blocking unit 830, respectively, for ease of explanation with reference to FIG. 8.

Referring to FIG. 8, the leakage current blocking unit 810 may block a leakage current using a diode in order to prevent a current element of a DC signal rectified by the rectification unit 630 of FIG. 6 from leaking towards the rectification unit 630. The ripple removing unit 820 may remove, using a capacitor $C_1$, a ripple signal from the DC signal in which the leakage current is blocked because a signal including a ripple may distort a DC signal. The offset blocking unit 830 may block a DC offset voltage included in the DC signal using a resistance. The DC offset voltage to be blocked may be determined based on a value of a resistance. The offset blocking unit 830 may control a level of blocking the DC offset voltage included in the DC signal, by adjusting the value of the resistance. A comparison unit 840 may output a 'High' value or a 'Low' value by comparing the DC signal and a reference signal. The DC signal may correspond to a signal in which a message is modulated by a source device, and may have different sizes depending on modulation. Accordingly, the 'High' value or the 'Low' value may be generated by comparing a size of the DC signal and a size of the reference signal.

The reference signal may be provided by a control unit 850. The reference signal may correspond to a predetermined fixed value. Also, the reference signal may correspond to a variable value that is set based on the DC signal of the wireless power. A DC/DC converter 860 may provide a driving voltage to the comparison unit 840. Also, the DC/DC converter 860 may provide a minimum voltage to be used in an operation of the control unit 850. Minimum energy to be used in the operation of the control unit 850 may be stored in a capacitor 861 so that the control unit 850 may be stably operated.

Figure 9:
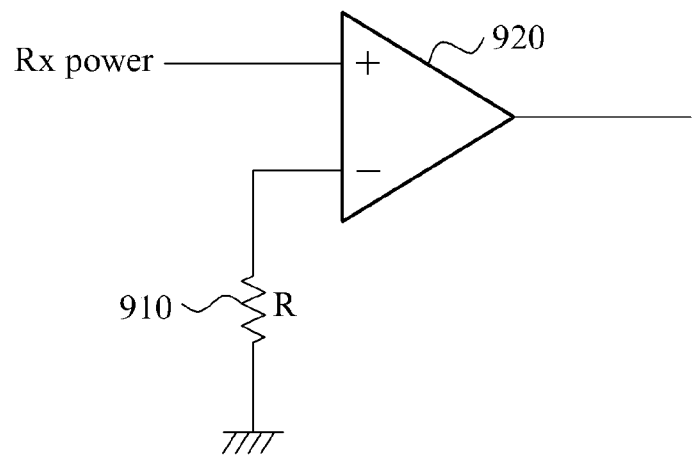
FIG. 9 is a diagram illustrating a method of generating a reference signal that is input to a comparison unit of FIG. 8, according to an illustrative example.

FIG. 9 illustrates a method of generating a reference signal that is input to the comparison unit 840 of FIG. 8, according to an illustrative example. In one example, the comparison unit 840 may be referred to as a comparison unit 920 for ease of explanation with reference to FIG. 9.

Referring to FIG. 9, the comparison unit 920 may output a 'High' value or a 'Low' value by comparing a received power (Rx power) and a reference signal. The Rx power may correspond to a DC signal rectified by a rectification unit 630.

The reference signal may be determined based on a value of a resistance 910 connected to the comparison unit 920.

The reference signal may have various values depending on the value of the resistance 910.

Figure 10:
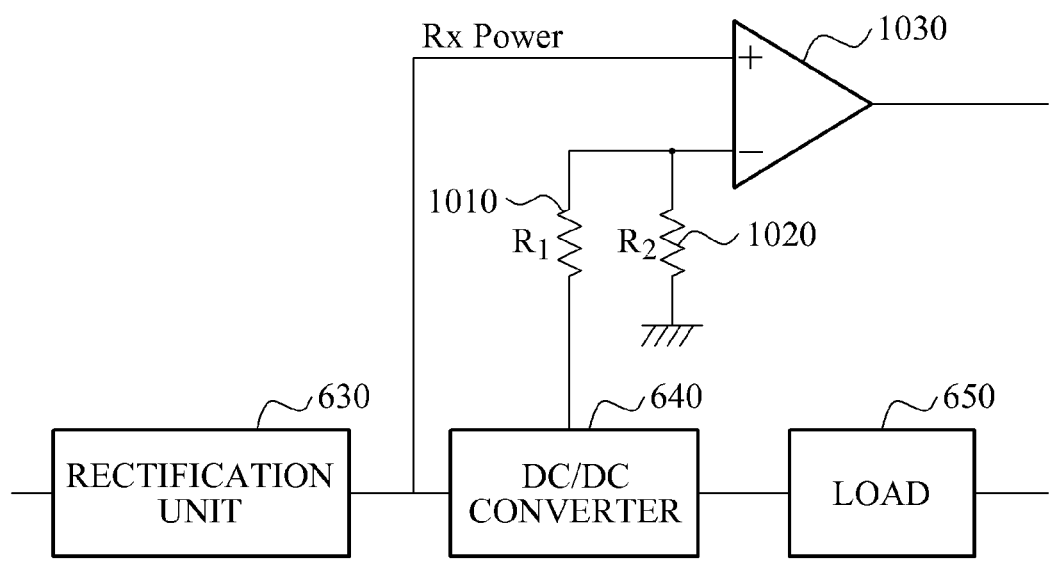
FIG. 10 is a diagram illustrating another method of generating a reference signal that is input to a comparison unit of FIG. 8, according to another illustrative example.

FIG. 10 illustrates another method of generating a reference signal that is input to the comparison unit 840 of FIG. 8, according to an illustrative example. In one example, the comparison unit 840 may be referred to as a comparison unit 1030 for ease of explanation with reference to FIG. 10.

Referring to FIG. 10, the comparison unit 1030 may output a 'High' value or a 'Low' value by comparing an Rx Power and a reference signal. In this instance, the voltage output from the DC/DC converter 640 of FIG. 6 may be applied to an input end of the comparison unit 1030 based on a relationship between a resistance 1010 and a resistance 1020.

In one example, the reference signal may be determined based on the voltage applied to the input end of the comparison unit. The reference signal may have various values because the voltage output from the DC/DC converter 640 may be distributed based on sizes of each of the resistance 1010 and the resistance 1020.

Figure 11:
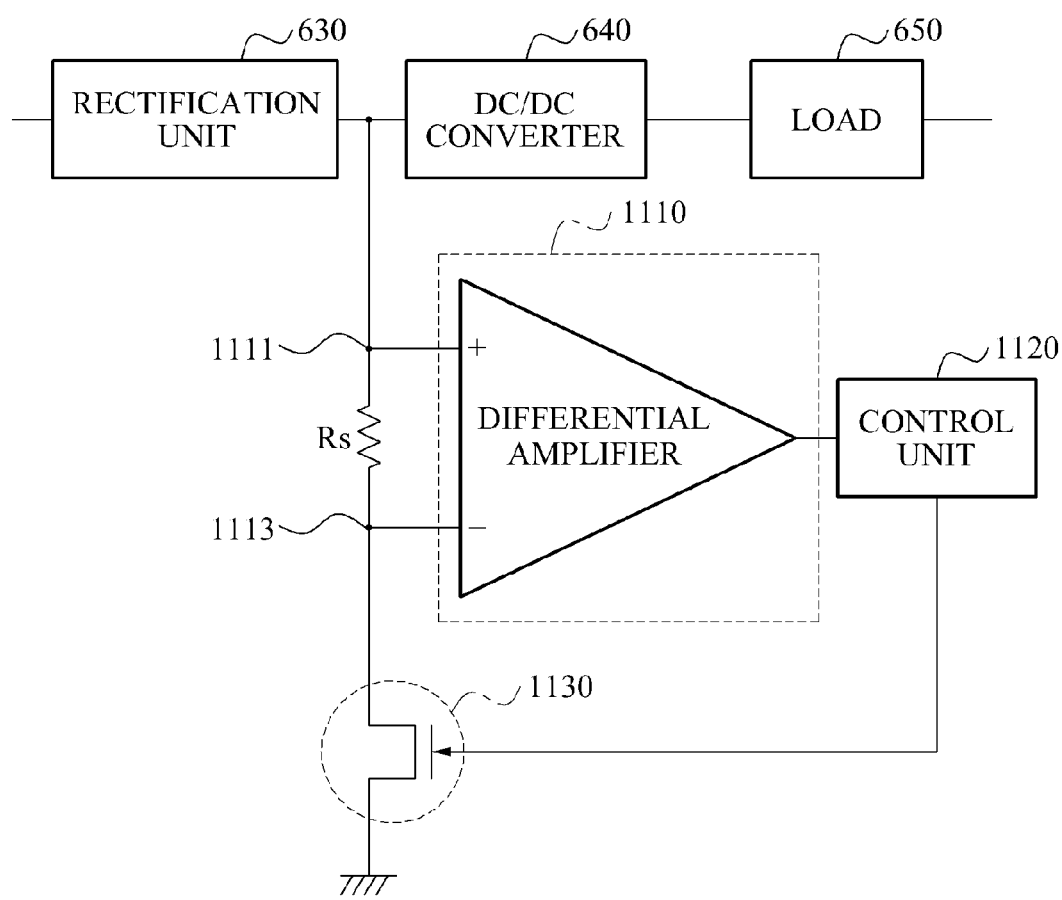
FIG. 11 is a block diagram illustrating yet another communication apparatus using a wireless power according to an illustrative example.

FIG. 11 illustrates yet another communication apparatus using a wireless power, according to an illustrative example.

Referring to FIG. 11, the communication apparatus includes a detection unit 1110, a control unit 1120, and a switch 1130. The detection unit 1110 may detect a current flowing through a resistance $R_S$ based on voltages applied to both ends 1111 and 1113 of the resistance $R_S$. In this instance, a difference between the voltages applied to both ends 1111 and 1113 of the resistances Rs may be amplified using a differential amplifier of the detection unit 1110. The control unit 1120 may demodulate a message, modulated and transmitted by a source device, based on a change in an amount of the current flowing through the resistance $R_s$, because the amount of the current flowing through the resistance $R_s$ may change depending on a level of modulating the message. The control unit 1120 may turn the switch 1130 ON when a message is received from the source device, and may turn the switch 1130 OFF when a message is not received from the source device. A timing of receiving the message from the source device may be predetermined between the source device and the target device. In this instance, a transistor may be used as the switch 1130. The transistor may include various types of transistors that are currently used, for example, a BJT, an FET, an IGBT, and the like.

Figure 12:
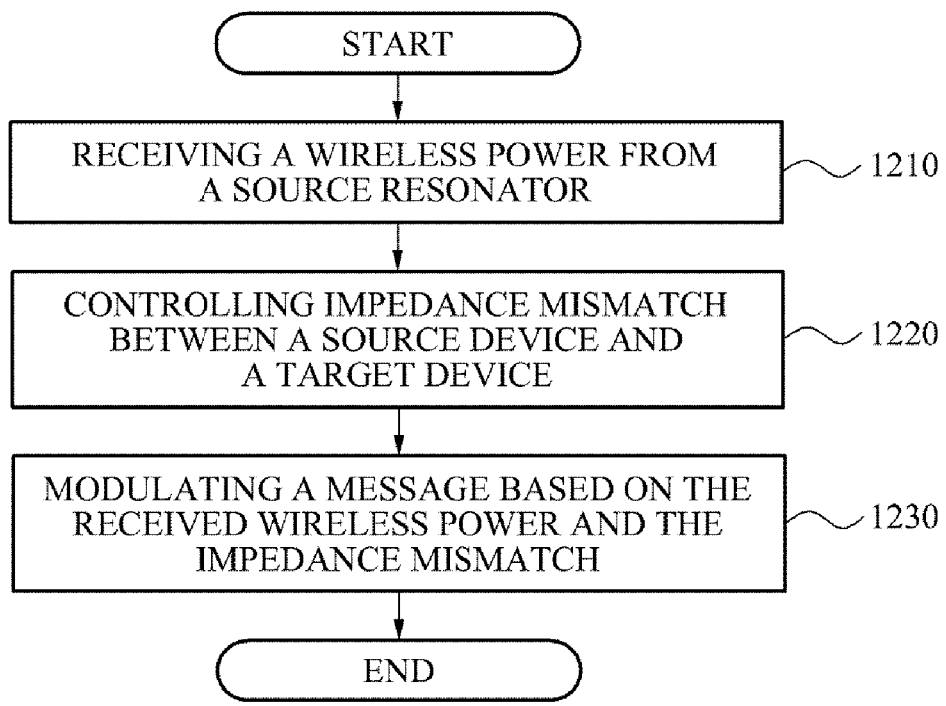
FIG. 12 is a diagram illustrating a communication method using a wireless power, according to an illustrative example.

Referring to FIG. 12, a communication method, in accordance with an illustrative example, may perform, at step 1210, receiving a wireless power from a source resonator through a magnetic coupling between the source resonator and a target resonator. At step 1220, the method may also control impedance mismatch between a source device and a target device by changing an impedance of the target device. At step 1230, the method may further modulate a message based on the received wireless power and the impedance mismatch.

The controlling may include changing the impedance of the target device by controlling an amount of a current or ON and OFF states of the current flowing through a load connected to a direct current-to-direct current (DC/DC) converter in parallel. The controlling may also include changing the impedance of the target device using ON and OFF states of a switch connected to a load of the target device. Furthermore, the controlling may include detecting a DC signal of the power received from the source resonator, amplifying the detected DC signal to be greater than a predetermined value, outputting a High value or a Low value by comparing the amplified DC signal and a reference signal, and controlling a switch connected to a load, based on the High value or the Low value.

Figure 13:
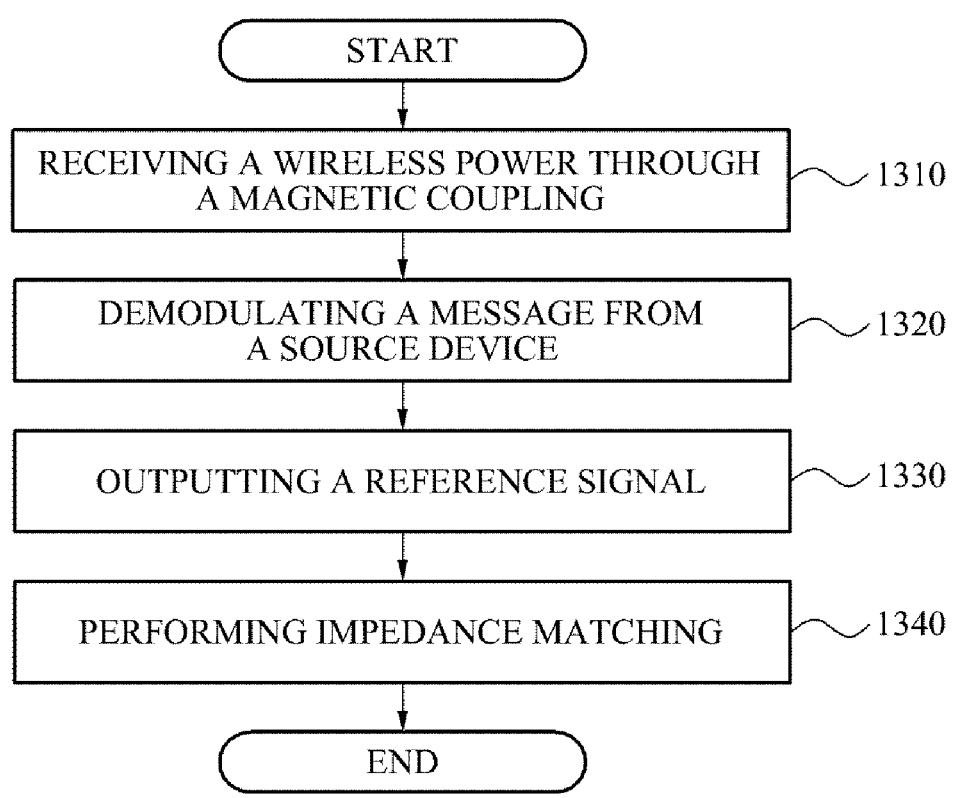
FIG. 13 is a diagram illustrating another communication method using a wireless power, according to an illustrative example.

Referring to FIG. 13, a communication method, in accordance with an illustrative example, may perform, at step 1310, receiving a wireless power through a magnetic coupling between a source resonator and a target resonator. At step 1320, the method may further include demodulating a message from a source device, by comparing a direct current (DC) signal of the received wireless power and a reference signal. At step 1330, the method may perform outputting the reference signal, and, at step 1340, the method may perform impedance matching between the source device and a target device.

It is to be understood that in the embodiment of the present invention, the operations in FIGS. 12 and 13 may be performed in the sequence and manner as shown although the order of some steps and the like may be changed without departing from the spirit and scope of the present invention.

Figure 14:
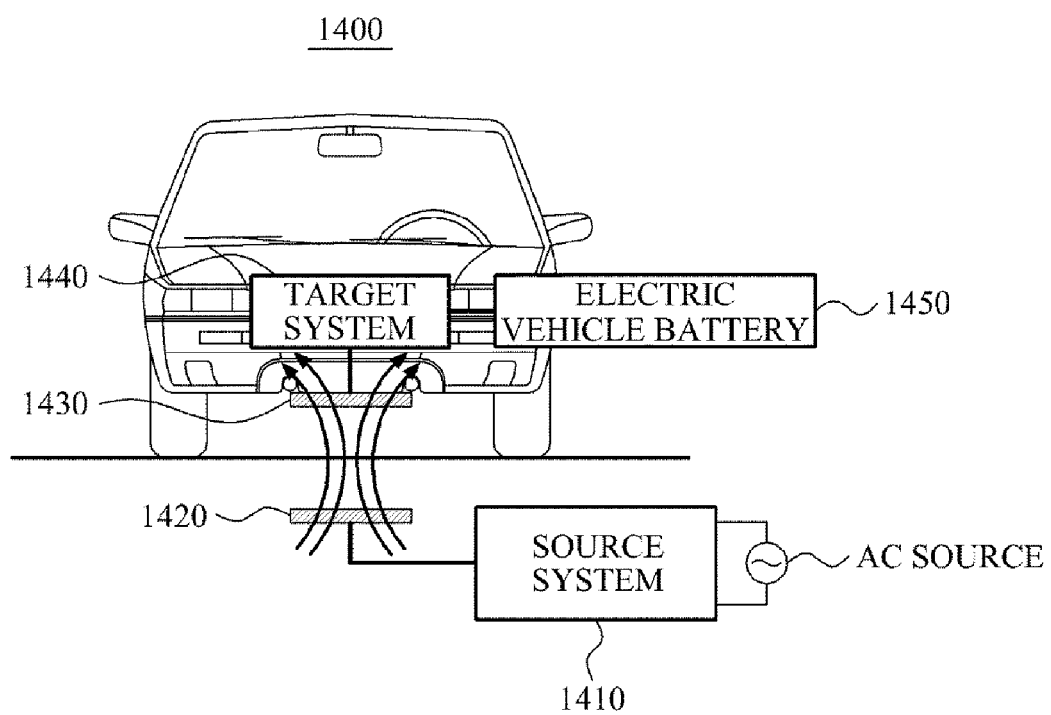
FIG. 14 is a diagram illustrating an electric vehicle charging system.

FIG. 14 illustrates an example of an electric vehicle charging system.

Referring to FIG. 14, an electric vehicle charging system 1400 includes a source system 1410, a source resonator 1420, a target resonator 1430, a target system 1440, and an electric vehicle battery 1450.

The electric vehicle charging system 1400 may have a similar structure to the wireless power transmission system of FIG. 1. The source system 1410 and the source resonator 1420 in the electric vehicle charging system 1400 may function as a source. Additionally, the target resonator 1430 and the target system 1440 in the electric vehicle charging system 1400 may function as a target.

The source system 1410 may include a AC/DC converter, a power detector, a power converter, a control/communication unit, similarly to the source device 110 of FIG. 1. The target system 1440 may include a Rectifying unit, a DC/DC converter, and a control/communication unit, similarly to the target device 120 of FIG. 1.

The electric vehicle battery 1450 may be charged by the target system 1440.

The electric vehicle charging system 1400 may use a resonant frequency in a band of a few kilohertz (KHz) to tens of MHz.

The source system 1410 may generate power, based on a type of charging vehicle, a capacity of a battery, and a charging state of a battery, and may supply the generated power to the target system 1440.

The source system 1410 may control the source resonator 1420 and the target resonator 1430 to be aligned. For example, when the source resonator 1420 and the target resonator 1430 are not aligned, the controller of the source system 1410 may transmit a message to the target system 1440, and may control alignment between the source resonator 1420 and the target resonator 1430.

For example, when the target resonator 1430 is not located in a position enabling maximum magnetic resonance, the source resonator 1420 and the target resonator 1430 may not be aligned. When a vehicle does not stop accurately, the source system 1410 may induce a position of the vehicle to be adjusted, and may control the source resonator 1420 and the target resonator 1430 to be aligned.

The source system 1410 and the target system 1440 may transmit or receive an ID of a vehicle, or may exchange various messages, through communication.

The descriptions of FIGS. 2 through 13 may be applied to the electric vehicle charging system 1400. However, the electric vehicle charging system 1400 may use a resonant frequency in a band of a few KHz to tens of MHz, and may transmit power that is equal to or higher than tens of watts to charge the electric vehicle battery 1450.

FIGS. 15A through 16B illustrate examples of applications in which a wireless power receiver and a wireless power transmitter may be mounted.

Figure 15A:
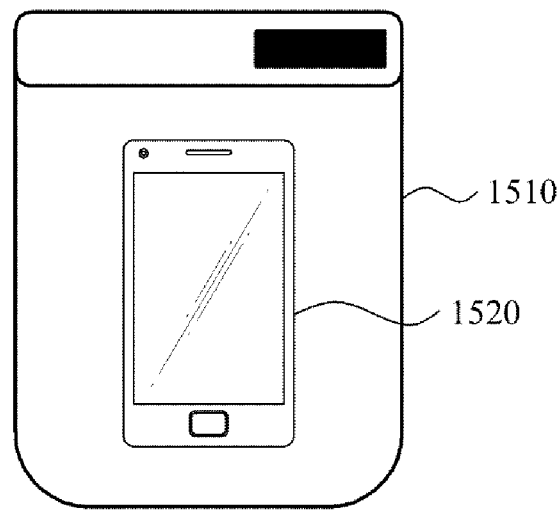
FIGS. 15A through 16B are diagrams illustrating examples of applications in which a wireless power receiver and a wireless power transmitter may be mounted.
Figure 15B:
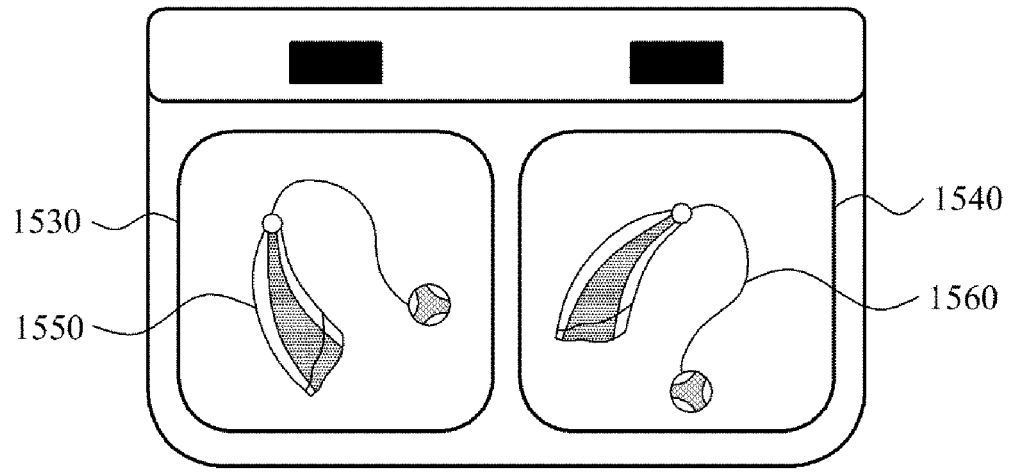

FIG. 15A illustrates an example of wireless power charging between a pad 1510 and a mobile terminal 1520, and FIG. 15B illustrates an example of wireless power charging between pads 1530 and 1540 and hearing aids 1550 and 1560.

In an example, a wireless power transmitter may be mounted in the pad 1510, and a wireless power receiver may be mounted in the mobile terminal 1520. The pad 1510 may be used to charge a single mobile terminal, namely the mobile terminal 1520.

In another example, two wireless power transmitters may be respectively mounted in the pads 1530 and 1540. The hearing aids 1550 and 1560 may be used for a left ear and a right ear, respectively. In this example, two wireless power receivers may be respectively mounted in the hearing aids 1550 and 1560.

Figure 16A:
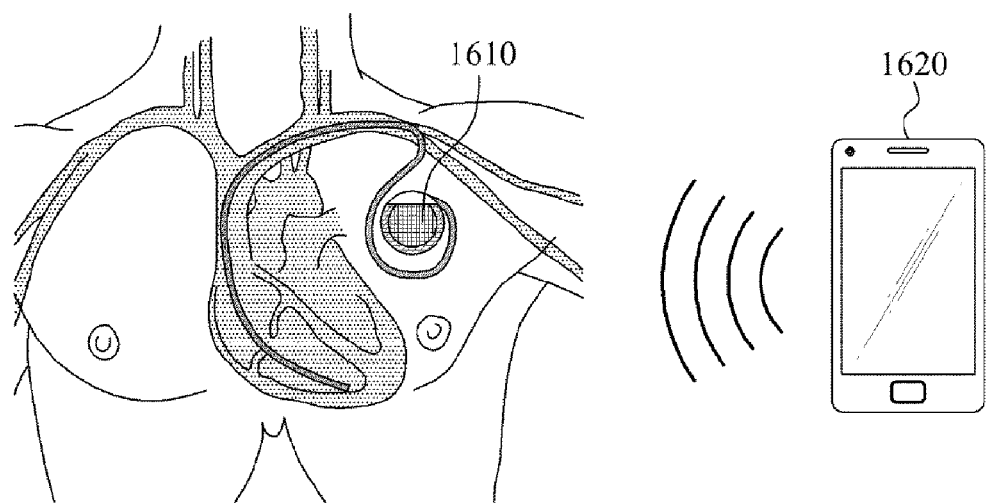
Figure 16B:
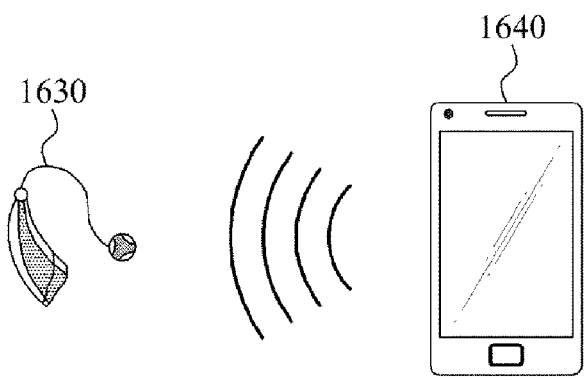

FIG. 16A illustrates an example of wireless power charging between an electronic device 2150 that is inserted into a human body, and a mobile terminal 1620. FIG. 16B illustrates an example of wireless power charging between a hearing aid 1630 and a mobile terminal 1640.

In an example, a wireless power transmitter and a wireless power receiver may be mounted in the mobile terminal 1620. In this example, another wireless power receiver may be mounted in the electronic device 2150. The electronic device 2150 may be charged by receiving power from the mobile terminal 1620.

In another example, a wireless power transmitter and a wireless power receiver may be mounted in the mobile terminal 1640. In this example, another wireless power receiver may be mounted in the hearing aid 1630. The hearing aid 1630 may be charged by receiving power from the mobile terminal 1640. Low-power electronic devices, for example Bluetooth earphones, may also be charged by receiving power from the mobile terminal 1640.

Figure 17:
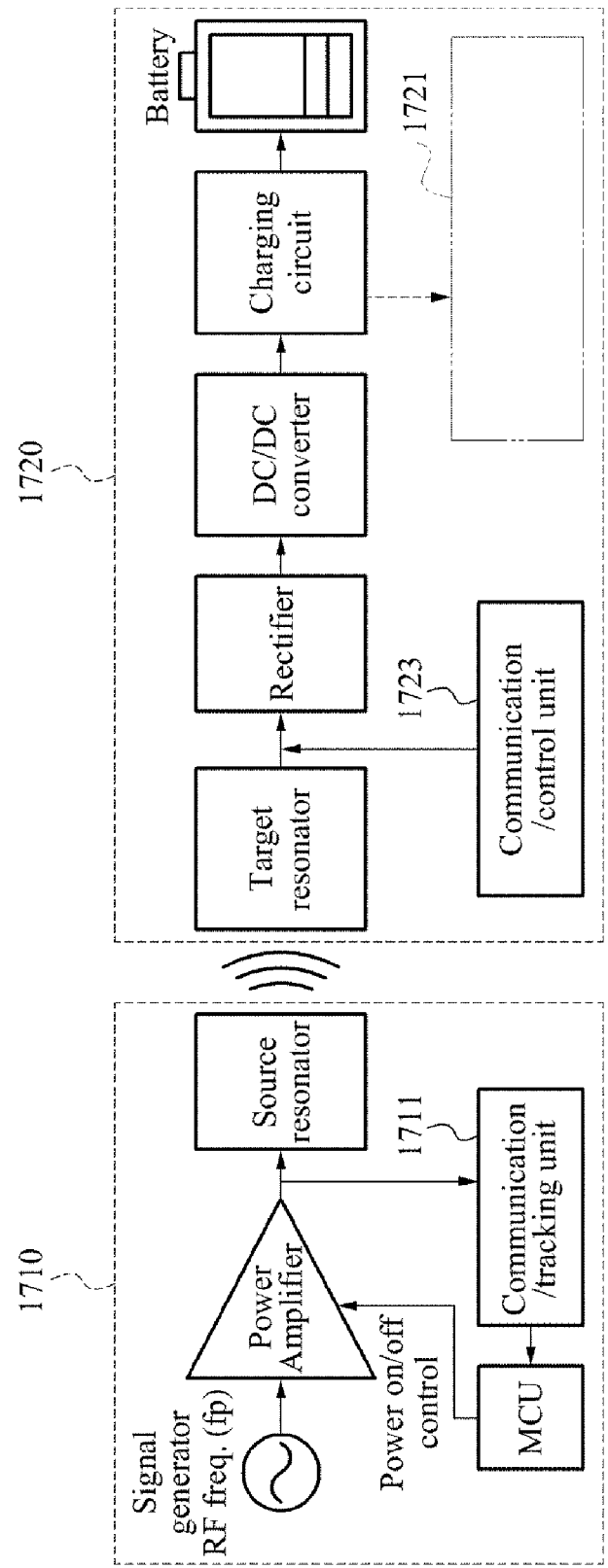
FIG. 17 is a diagram illustrating an example of a wireless power transmitter and a wireless power receiver.

FIG. 17 illustrates an example of a wireless power transmitter and a wireless power receiver.

In FIG. 17, a wireless power transmitter 1710 may be mounted in each of the pads 1530 and 1540 of FIG. 15B. Additionally, the wireless power transmitter 1710 may be mounted in the mobile terminal 1640 of FIG. 16B.

In addition, a wireless power receiver 1720 may be mounted in each of the hearing aids 1550 and 1560 of FIG. 15B.

The wireless power transmitter 1710 may have a similar configuration to the source device 110 of FIG. 1. For example, the wireless power transmitter 1710 may include a unit configured to transmit power using magnetic coupling.

As illustrated in FIG. 17, the wireless power transmitter 1710 includes a communication/tracking unit 1711. The communication/tracking unit 1711 may communicate with the wireless power receiver 1720, and may control an impedance and a resonant frequency to maintain a wireless power transmission efficiency. Additionally, the communication/tracking unit 1711 may perform similar functions to the power converter 114 and the control/communication unit 115 of FIG. 1.

The wireless power receiver 1720 may have a similar configuration to the target device 120 of FIG. 1. For example, the wireless power receiver 1720 may include a unit configured to wirelessly receive power and to charge a battery. As illustrated in FIG. 17, the wireless power receiver 1720 includes a target resonator, a rectifier, a DC/DC converter, and a charging circuit. Additionally, the wireless power receiver 1720 may include a control/communication unit 1723.

The communication/control unit 1723 may communicate with the wireless power transmitter 1710, and may perform an operation to protect overvoltage and overcurrent.

The wireless power receiver 1720 may include a hearing device circuit 1721. The hearing device circuit 1721 may be charged by the battery. The hearing device circuit 1721 may include a microphone, an analog-to-digital converter (ADC), a processor, a digital-to-analog converter (DAC), and a receiver. For example, the hearing device circuit 1721 may have the same configuration as a hearing aid.

Program instructions to perform a method described in FIGS. 9-10 and 12-13, or one or more operations thereof, may be recorded, stored, or fixed in one or more non-transitory computer-readable storage media. The program instructions may be implemented by a computer. For example, the computer may cause a processor to execute the program instructions. The media may include, alone or in combination with the program instructions, data files, data structures, and the like. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

The units described herein may be implemented using hardware components and software components. For example, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A target device which receives a wireless power, comprising:
   a target resonance unit configured to receive a wireless power from a source resonator through a magnetic coupling, to output an AC voltage, and to generate a signal which is detected by a source device which transmits a wireless power to the target device;
   a rectifier configured to output a DC voltage by rectifying the AC voltage outputted from the target resonance unit;
   a DC/DC converter configured to adjust the DC voltage outputted from the rectifier;
   at least one load configured to selectively be connected to the DC/DC converter; and
   a control unit configured to control a current flowing to the at least one load to generate an impedance mismatch between the source device and the target device,
   wherein the control unit generates the signal through the impedance mismatch.

2. The target device of claim 1, wherein the control unit is further configured to adjust an impedance of the target device by controlling ON and OFF states of the current flowing to the at least one load.

3. The target device of claim 1, wherein the control unit is further configured to adjust an impedance of the target device through a current source operating as a load.

4. The target device of claim 1, wherein the control unit is further configured to adjust an impedance of the target device, based on an amount of power stored in a battery of the target device.

5. The target device of claim 1, wherein the control unit is further configured to adjust an impedance of the target device using ON and OFF states of a switch that connects the DC/DC converter and the at least one load.

6. The target device of claim 1, further comprising a modulation unit configured to modulate a message based on the wireless power and the impedance mismatch.

7. The target device of claim 6, wherein the modulation unit comprises:
   a detection unit configured to detect a DC signal of the wireless power received from the source resonator;
   an amplification unit configured to amplify the detected DC signal by a predetermined factor;
   a comparison unit configured to output a High value or a Low value by comparing the amplified DC signal and a reference signal; and
   a switch controlling unit to control a switch connected to a load based on the High value or the Low value.

8. The target device of claim 7, wherein the reference signal corresponds to an objective voltage to be used to modulate the message.

9. An operation method of target device which receives a wireless power, the method comprising:
   receiving a wireless power from a source resonator through a magnetic coupling:
   outputting an AC voltage and generating a signal which is detected by a source device which transmits a wireless power to the target device;
   outputting a DC voltage by rectifying the outputted AC voltage;
   adjusting the outputted DC voltage;
   selectively connecting the adjusted DC voltage to at least one load; and
   controlling a current flowing to the at least one load to generate an impedance mismatch between the source device and the target device,
   wherein the impedance mismatch generates the signal.

10. The method of claim 9, wherein the generating comprises adjusting an impedance of the target device by controlling ON and OFF states of the current flowing to the at least one load.

11. The method of claim 9, wherein the generating comprises adjusting an impedance of the target device through a current source operating as a load.

12. The method of claim 9, wherein the generating comprises adjusting an impedance of the target device, based on an amount of power stored in a battery of the target device.

13. The method of claim 9, wherein the generating comprises adjusting an impedance of the target device using ON and OFF states of a switch that connects the adjusted DC voltage and the at least one load.

14. The method of claim 9, further comprising a modulating a message based on the wireless power and the impedance mismatch.

15. The method of claim 14, wherein the modulating comprises:
   detecting a DC signal of the wireless power received from the source resonator;
   amplifying the detected DC signal by a predetermined factor;
   outputting a High value or a Low value by comparing the amplified DC signal and a reference signal; and
   controlling a switch connected to a load based on the High value or the Low value.

16. The method of claim 15, wherein the reference signal corresponds to an objective voltage to be used to modulate the message.

* * * * *